US006395186B1

(12) United States Patent
De Kock et al.

(10) Patent No.: US 6,395,186 B1
(45) Date of Patent: May 28, 2002

(54) PRESSURE LIQUID FILTRATION WITH ULTRASONIC BRIDGING PREVENTION

(75) Inventors: Allen De Kock, Grandville; Christopher Rau, Lansing, both of MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/599,082

(22) Filed: Jun. 20, 2000

(51) Int. Cl.[7] .......................... C02F 1/36; B01D 29/64; B01D 35/20
(52) U.S. Cl. ...................... 210/748; 210/791; 210/408; 210/413
(58) Field of Search ................. 210/748, 785, 210/791, 407, 416.1, 408, DIG. 5, 413, 414

(56) References Cited

U.S. PATENT DOCUMENTS

| 3,161,591 A | 12/1964 | Petter et al. |
| 3,461,651 A | 8/1969 | Van Ingen |
| 3,692,178 A | 9/1972 | Reece |

(List continued on next page.)

FOREIGN PATENT DOCUMENTS

| EP | 1 044 713 | 10/2000 |
| FR | 1 509 352 | 3/1968 |
| FR | 2 742 352 | 6/1997 |
| GB | 1 275 037 | 5/1972 |
| JP | 10244224 | 9/1998 |

OTHER PUBLICATIONS (Precision Cleaning) (PC), Mar. 1999, pp. 28–36 "What's the Frequency?" by Rick Reynolds.

(Parts Cleaning), May 1998, pp. 17–21, "How Now" by Harish A. Bhatt.

Seminar Lecture copy (from www.healthsonics.com), Lecture presented 1990, copy dated Jul. 15, 1998, "The Ins and Outs of Ultrasonic Cleaning" by Howard Houke.

Printout from Worldwide Web (website unknown), (date unknown), 10 pages, "Index . . . Ultrasonic Cleaning Process . . . General Cleaning Instructions . . . Products", (author unknown).

Single Worldwide Web printout page from search: "Ultrasonic Consoles Stainless Steel Tanks", "Precision Cleaning Systems . . ", web address www.tmasc.com/page 4c.h.

Web page from search: Ultrasonic cleaners, (undated), "All three NEY Ultrasonik cleaners . . . ", Web address www.hurricane.net/~olympi . . . (incomplete).

*Primary Examiner*—David A. Simmons
*Assistant Examiner*—Fred Prince
(74) *Attorney, Agent, or Firm*—Flynn, Thiel, Boutell & Tanis, P.C.

(57) ABSTRACT

Methods and apparatus for increasing the continuous filtering flow rate through a pressure liquid filter unit of liquid-to-be-filtered having (1) a carrier liquid, (2) coalescing solids particles which tend to adhere and bridge filter element gaps sized substantially larger than said particles and (3) larger impurity elements to be filtered out of the liquid-to-be-filtered and sized larger than such filter element gap. A pressure liquid filter unit contains a filter element having gaps, a given gap being sized to reliably pass the carrier liquid and coalescing solids particles at a first relatively low liquid flow rate, but blocking coalescing solids particles passage therethrough due to bridging of said gaps by the coalescing solids particles at a relatively high liquid flow rate. The coalescing solids particles adjacent said gap are agitated at an ultrasonic frequency, thereby passing the carrier liquid and coalescing solids particles through the gap at the relatively high flow rate without bridging and blinding of the gap by the coalescing solids particles.

32 Claims, 10 Drawing Sheets

U.S. PATENT DOCUMENTS

| | | |
|---|---|---|
| 3,870,640 A | 3/1975 | Reece |
| 4,011,157 A * | 3/1977 | Pennebaker, Jr. et al. |
| 4,193,009 A | 3/1980 | Durley, III |
| 4,253,962 A | 3/1981 | Thompson |
| 4,409,005 A | 10/1983 | McKendrick |
| 4,642,188 A | 2/1987 | DeVisser et al. |
| 4,802,487 A | 2/1989 | Martin et al. |
| 4,836,922 A | 6/1989 | Rishel et al. |
| 5,059,331 A | 10/1991 | Goyal |
| 5,062,965 A | 11/1991 | Bernou et al. |
| 5,084,176 A | 1/1992 | Davis et al. |
| 5,088,510 A | 2/1992 | Bannon |
| 5,198,111 A | 3/1993 | Davis |
| 5,298,161 A | 3/1994 | Sieg |
| 5,343,443 A | 8/1994 | Merewether |
| 5,395,592 A * | 3/1995 | Bolleman et al. |
| 5,527,462 A | 6/1996 | Davis et al. |
| 5,569,383 A | 10/1996 | Vander Ark, Jr. et al. |
| 5,951,456 A * | 9/1999 | Scott |
| 6,251,294 B1 | 6/2001 | Davis et al. |

* cited by examiner

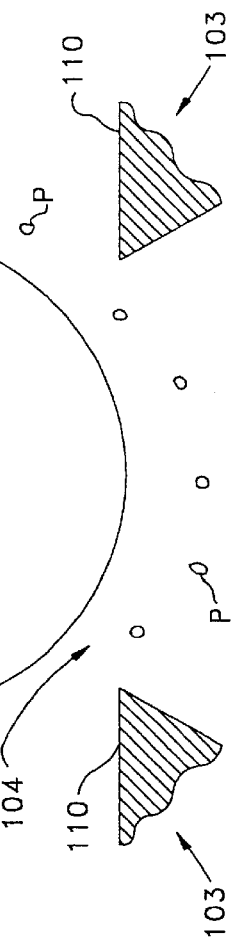
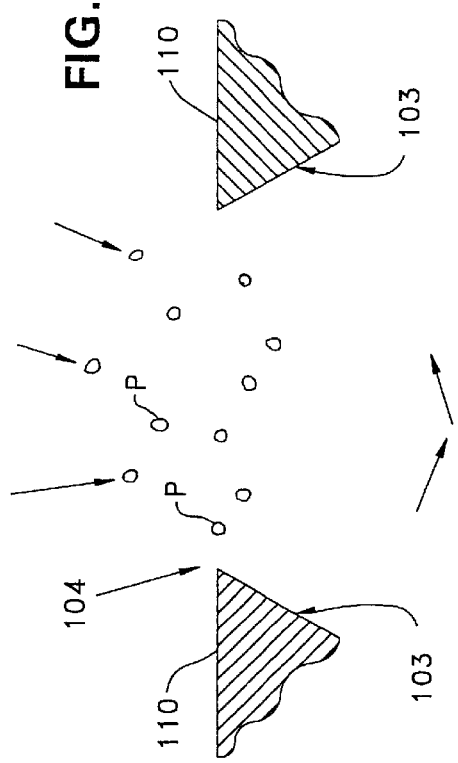
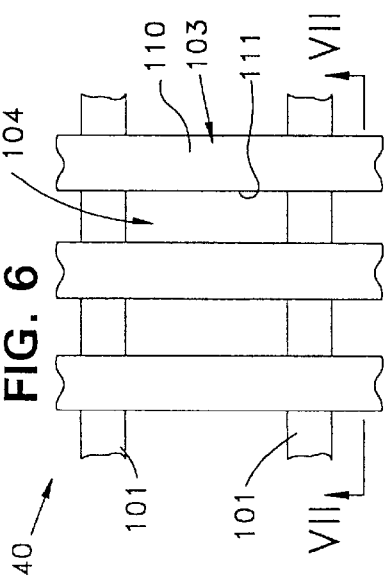
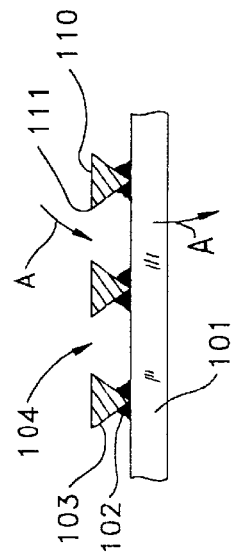

PRESSURE LIQUID FILTRATION WITH ULTRASONIC BRIDGING PREVENTION

FIELD OF THE INVENTION

This invention relates generally to industrial liquid pressure filter apparatus and methods, for liquid-to-be-filtered having (1) a carrier liquid, (2) coalescing solids particles which tend to stick together to bridge and thus blind a filter element gap sized larger than the width of such particles, and (3) larger impurity elements to be filtered out and sized larger than such a filter element gap.

BACKGROUND OF THE INVENTION

Ultrasonic energy has been applied to prior flow separation situations-but, insofar as known to Applicants, not to the field to which the present invention is directed.

More particular, prior applications of ultrasonic energy in flow separation have included the following.

Thompson U.S. Pat. No. 4,253,962 intends to avoid use of chemical cleaning agents for cleaning ion selective membranes, such as reverse osmosis and electrodialysis membranes, of impurities to be filtered out, by applying ultrasonic energy below the threshold of cavitation in a manner to avoid destruction of the membrane by standing waves. Such a membrane is not self-supporting but rather requires a perforate rigid backing (for example, a mesh structure in turn backed by a rigid perforated tube.

Sieg U.S. Pat. No. 5,298,161, Goyal U.S. Pat. No. 5,059,331 and a pending U.S. Application (Attorney Ref: R-P Case 27), now U.S. Pat. No. 6,251,294, assigned to the Assignee of the present invention disclose filtration systems with alternate filtration and cleaning cycles. Ultrasonic energy is applied to supplement or substitute for backwashing, during the cleaning cycle (not during the filtration cycles) to remove impurities to be filtered out, from the input side of the filter, and thereby renew the filter for another cycle of filtration.

However, none of these pressure liquid applications of ultrasonic energy deals with the above stated field of the present invention.

Ultrasonic energy has also been used to agitate an open screen used to separate, for example, dry contaminants from dry corn kernels. However, such application is even more remote from the above stated field of the present invention.

Turning more particularly to prior art in the field of the present invention, a series of inventions are disclosed and claimed in U.S. patents assigned to the Assignee of the present invention, and issued over approximately the last four decades. The latter patents apply to the field of the present invention and have attempted to overcome the problem to which the present invention is directed, as follows.

Petter, et al. U.S. Pat. No. 3,161,159 recognized, as to liquid solutions, suspensions and the like having a high solids content, particularly certain liquids of a viscous nature or otherwise having a high solids content such as colloidal gels, lime and clay slurries, starch solutions, clay coatings and the like in which the solids tend to coagulate or coalesce, that the filtering out of large impurity elements is a difficult problem.

For convenience herein, such a difficult-to-filter liquid is herein referred to as a composite liquid, which may be described as comprising (1) a carrier liquid and (2) coalescing solids particles which tend to stick together. Such coalescing solids particles, even at relatively low flow rates, tend to bridge, rather than pass with the carrier liquid through, the filtering gaps in the filter element.

Petter's disclosed solution to the problem involved suspending elongate pressure air supply and exhaust hoses in the filter housing flanking the filter element, and from the hoses suspending a casing in the bottom of the housing below the filter element. The casing contains a circular path generally coaxial with the filter element and housing. A weighted ball is pushed by air pressure from the suspending air hoses along the circular path. The orbiting of the ball therein moves the casing and lower air hose portions in respective circular orbits in the liquid space inside the filter housing and outside the filter element, and thus moves the liquid-to-be-filtered in the housing in an attempt to maintain the coalescing solids particles in suspension in the carrier liquid. Reece U.S. Pat. No. 3,692,178 discloses a generally similar arrangement.

To attempt to improve on the aforementioned Petter and Reece inventions, Reece U.S. Pat. No. 3,870,640 fixed an air powered ball casing to the bottom of the suspended filter element and led the air supply and exhaust hoses through the open top (outlet) of the filter element and down inside the filter element to the air-powered ball casing at the bottom of the filter element, to vibrate the filter element. This approach was advanced by DeVisser, et al. U.S. Pat. No. 4,642,188 by fixing a single air-powered ball casing to the bottom of a group of three, side-by-side filter elements, to vibrate more filtering area in a single filter housing.

Thereafter, to attempt to improve on the aforementioned DeVisser invention, particularly to make more uniform the filter element vibration along the length of the filter element, Rishel, et al. U.S. Pat. No. 4,836,922 used an air powered ball casing to pendently support the top of the filter element group from the overlying top of the filter housing.

Thereafter, Davis et al. U.S. Pat. No. 5,084,176 reoriented the air powered ball casing of Rishel to change the plane of travel of the circulating ball to vibrate the filter element axially rather than radially, for use with a liquid-to-be-filtered less sensitive to coalescing particle sheer than in the Rishel patent.

Thus, over about the last four decades, the sequence of invention in the field of the invention has used an air powered ball casing vibrator, first to directly agitate liquid in a filter housing, then to directly vibrate the bottom of a filter element, then to directly vibrate the bottom of a group of the filter elements, then to attach the top of a filter element group to the filter housing and vibrate the filter element group (initially laterally and later axially).

While many of these air powered vibrator equipped filter units are still in satisfactory service, the Assignee of the present invention has now discontinued their manufacture (except as replacements for customer in-the-field older units), and has switched the sequence of invention, in the field of the present invention, to mechanically cleaned filter elements, examples of which it now manufactures and markets in its DCF™ line of filter units.

More particularly, Davis U.S. Pat. No. 5,198,111; Davis et al. U.S. Pat. No. 5,527,462 and Vander Ark U.S. Pat. No. 5,569,383, all assigned to the Assignee of the present invention, each require, per housing, a single relatively large diameter cylindrical filter element in which filtration flow direction is reversed (from the air powered vibrator equipped filter units above discussed) namely, from inside out, wherein a mechanically driven cleaning member moves slowly but continuously along the inlet surface of the filter element and mechanically wipes or scrapes coalescing solids particle bridges from the filter element gaps back into suspension in the liquid-to-be-filtered.

Accordingly, the recent prior art developments by the present Assignee have eliminated vibrating devices in favor of the above mentioned wiper/scraper equipped filter units, to try to overcome the continuing problem in the field of the present invention.

Such scraper/wiper equipped filter units have been commercially successful in a variety of filtering uses, in some instances in which a composite liquid includes particularly aggressively coalescing solids particles and the filter element blinds at less than a commercially acceptable filtration flow rate.

Accordingly, the objects and purposes of the invention include provision of methods and apparatus for preventing bridging, and thus continuing filtration flow, through a liquid pressure filter unit, of liquid-to-be-filtered of the kind having (1) a carrier liquid (2) coalescing solids particles which tend to stick together to bridge and thus blind a filter element gap sized larger than the width of the said particles, and (3) larger impurity elements to be filtered out of said liquid-to-be-filtered and sized larger than such a filter element gap, and doing so at substantially enhanced flow rates approaching or exceeding commercial acceptance levels.

Other objects and purposes of the invention will be apparent to persons acquainted with apparatus and methods of this kind upon reading the accompanying specification and inspecting the accompanying drawings.

SUMMARY OF THE INVENTION

The invention includes methods and apparatus for increasing the continuous filtering flow rate through a pressure liquid filter unit of liquid-to-be-filtered having (1) a carrier liquid, (2) coalescing solids particles which tend to adhere and bridge filter element gaps sized substantially larger than said particles and (3) larger impurity elements to be filtered out of said liquid-to-be-filtered and sized larger than such filter element gap, comprising:

providing a pressure liquid filter unit having a housing with an inlet and an outlet and containing a filter element having gaps, a given gap being sized to reliably pass the carrier liquid and coalescing solids particles at a first relatively low liquid flow rate, but blocking coalescing solids particles passage therethrough due to bridging of said gaps by the coalescing solids particles at a relatively high liquid flow rate;

simultaneously flowing the liquid-to-be-filtered under pressure through the inlet into the housing at the relatively high flow rate and applying ultrasonic energy to the liquid-to-be-filtered in the housing;

at an ultrasonic frequency agitating the coalescing solids particles adjacent said gap and thereby passing the carrier liquid and coalescing solids particles through the gap at the relatively high flow rate without bridging and blinding of the gap by the coalescing solids particles.

BRIEF DESCRIPTION OF THE DRAWINGS

FIG. 6 is a schematic enlarged elevational view of a fragment of the FIG. 1 filter element.

FIG. 7 is a cross sectional view substantially taken on the line VII—VII of FIG. 6.

FIG. 8 is an enlarged fragment of FIG. 7 schematically showing flow, at a relatively slow rate, of carrier liquid and coalescing particles through a filter element gap.

FIG. 9 is a view similar to FIG. 8 but schematically showing a contaminant element, of the kind to be filtered out, located adjacent the input side of the gap.

DETAILED DESCRIPTION

A pressure liquid filter unit 18 (FIG. 1), embodying the invention, includes an elongated, generally cylindrically shaped filter housing 20 having inlet and outlet ports 30 and 44 respectively.

Figure 1:
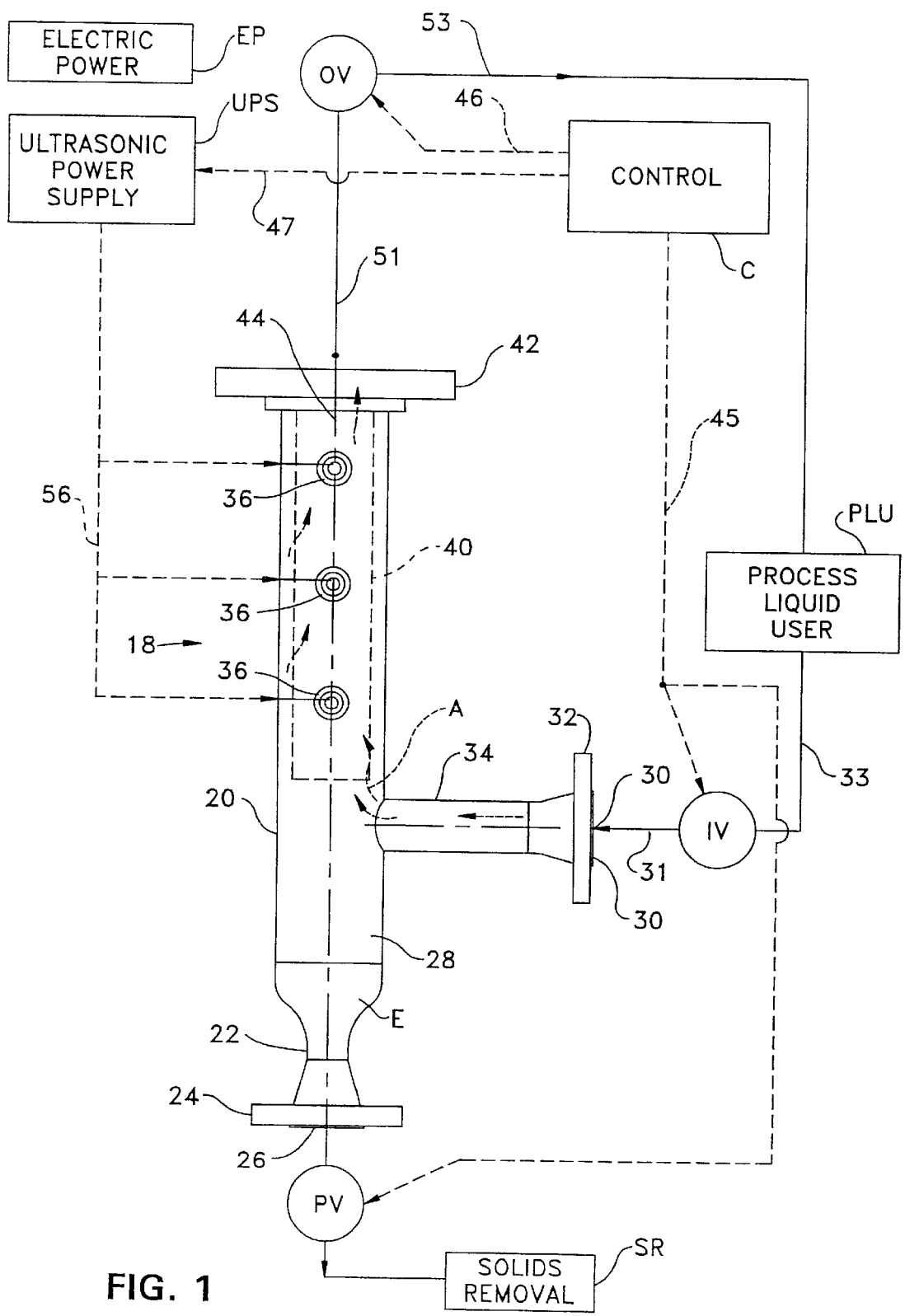
FIG. 1 is a front-view of a filter unit embodying the present invention.

The inlet port 30, e.g. at a middle portion of the housing 20 in FIG. 1, is adapted to receive a liquid-to-be-filtered. The inlet port 30 is here formed by a stub pipe 34 carrying a conventional flange 32. Inlet port 30 is conveniently connectable through flange 32, conventional piping 31, a conventional normally open inlet valve IV, and piping 33 to the outlet of a conventional industrial process liquid user device PLU which outputs the liquid-to-be-filtered under pressure.

The filtered composite liquid outlet port 44 (FIG. 1) is here formed by an outlet flange 42, e.g. at the top portion of the filter housing 20. The outlet port 44 is conventionally connectable through the flange 42, conventional piping 51, a normally open outlet valve OV, and further conventional piping 51 to the filter composite liquid inlet of the process liquid user PLU.

At least one conventional filter element is schematically shown in broken line at 40 in FIG. 1 and is fixed in filter housing 20. A typical filter element 40 is formed as an elongate tubular cup with at least its peripheral wall formed of any conventional, rigid, porous filtration material.

The rigid porous filtration material may be of any conventional type, including woven wire mesh and welded wire grid. A fragmentary example of the latter is shown in FIGS. 6 and 7, wherein, for example, interior circumferentially extending support wires 101 are spaced axially of the filter element 40 and rigidly support, typically by welding as at 102, exterior wires 103 which extend axially of the filter element 40 and are circumferentially spaced by filtering gaps 104. In the conventional welded wire mesh filter element 40 here shown by way of example, the axial wires 103 are of triangular cross section (FIG. 7), preferably of isosceles triangular cross section, whose base defines the exterior surface 110 thereof, which faces the liquid-to-be-filtered. The opposed, acutely angled edges 111 of adjacent axial wires 103 bound the filtering gap 104. In FIG. 7, the arrows A indicate the directional flow through the wall 101, 103 of the filter element 40.

As generally indicated by the broken line arrow A in FIG. 1, the filter element 40 here shown receives liquid-to-be-filtered at its outer surface, from the surrounding zone 116 (FIG. 2) in the filter housing 20 fed by the inlet port 30, and has a top opening open to the outlet port 44 for outputting filtered composite liquid.

The filter housing 20 (FIG. 1) also includes an impurities storage portion 22, in which collect impurities elements removed from the liquid-to-be-filtered by the filter element 40. In the embodiment shown, the storage portion 22 is at the bottom of filter housing 20, well below the input port 30, to receive filtered-out impurities elements (a collection of which is schematically shown at 28), which are heavier than, and so sink in, the liquid in the filter housing 20. For impurities elements lighter than the liquid, the FIG. 1 structure may be inverted. The storage portion 22 has a purge port 26 for removal of impurities elements from the housing 20. The purge port 26 here opens through a flange 24 fixed on the housing 20 and connected through a normally closed purge valve PV to a conventional impurities element removal system SR. Purge valve PV may be opened occasionally to remove an impurities elements collection 28 from the filter housing 20.

Normally (i.e. during filtration) the inlet and outlet valves IV and OV are open and the purge valve PV is closed.

At least one conventional ultrasonic transducer(s) 36 (FIG. 1) is fixed with respect to the housing 20 for applying ultrasonic energy to the liquid in the filter housing 20. A conventional ultrasonic power supply UPS is connectable to receive electrical power from a conventional electric power source EP (e.g. a 120 volt AC commercial wall outlet) and produces ultrasonic frequency electric power. The transducers 36, when energized by such ultrasonic frequency electric power, produce corresponding ultrasonic frequency mechanical vibration in the liquid-to-be-filtered in the filter housing 20.

The ultrasonic power supply UPS and ultrasonic transducers 36 may be of a variety of types. In particular, the ultrasonic tranducers 36 can be of conventional magnetostrictive or other type, but in the preferred embodiment shown are piezoelectric transducers. For example, one filter 18, constructed in accord with the invention, used Ultrasonic Power Co. UPC of Freeport, Ill. ultrasonic power supply model M 5300 SW and transducer item 51-01-023-3.

Conductor pairs (FIG. 1), schematically indicated by the dotted line 56, supply ultrasonic frequency electric power to the ultrasonic transducers 36 from the ultrasonic power supply UPS. It may be desired to mount several tranducers on the housing 20. In the unit shown in FIGS. 1 and 2, three transducers 36 are axially spaced along one side of the housing 20 and three corresponding transducers 36 are correspondingly spaced along the opposite side of the housing 20. The number and location of transducers 36 may vary with need.

Figure 5:
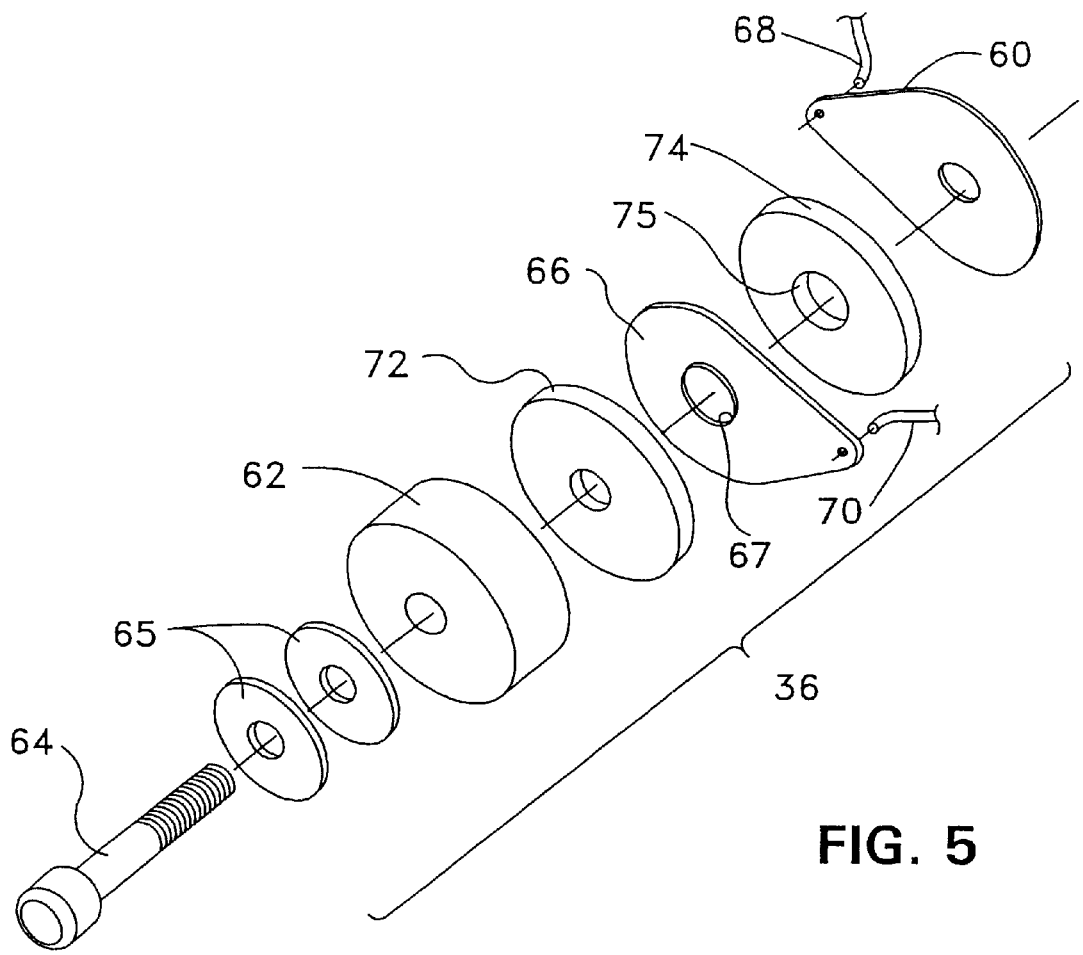
FIG. 5 is an exploded view of an ultrasonic transducer of FIGS. 1–14.
Figure 3:
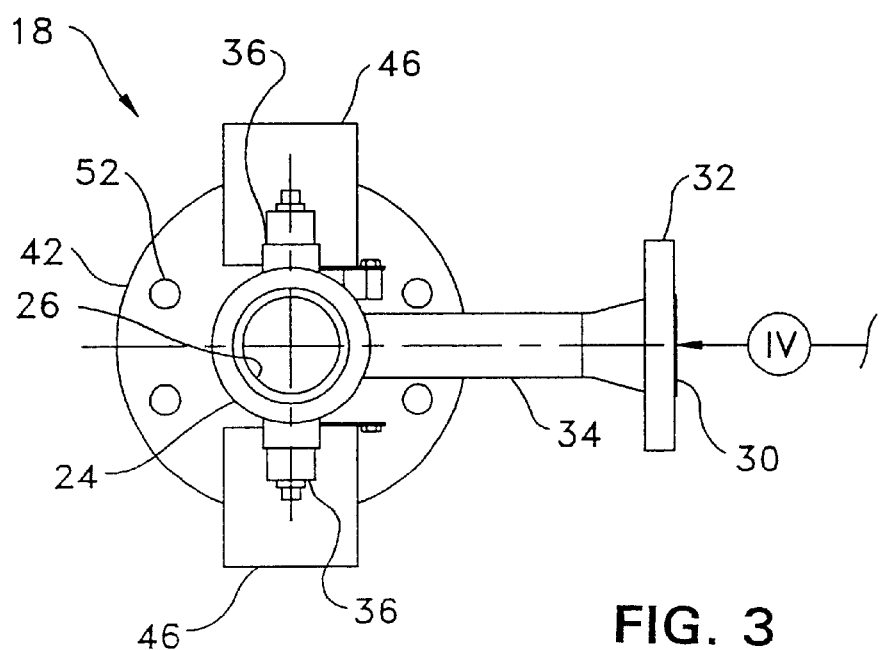
FIG. 3 is a bottom view of the FIG. 1 filter unit.
Figure 4:
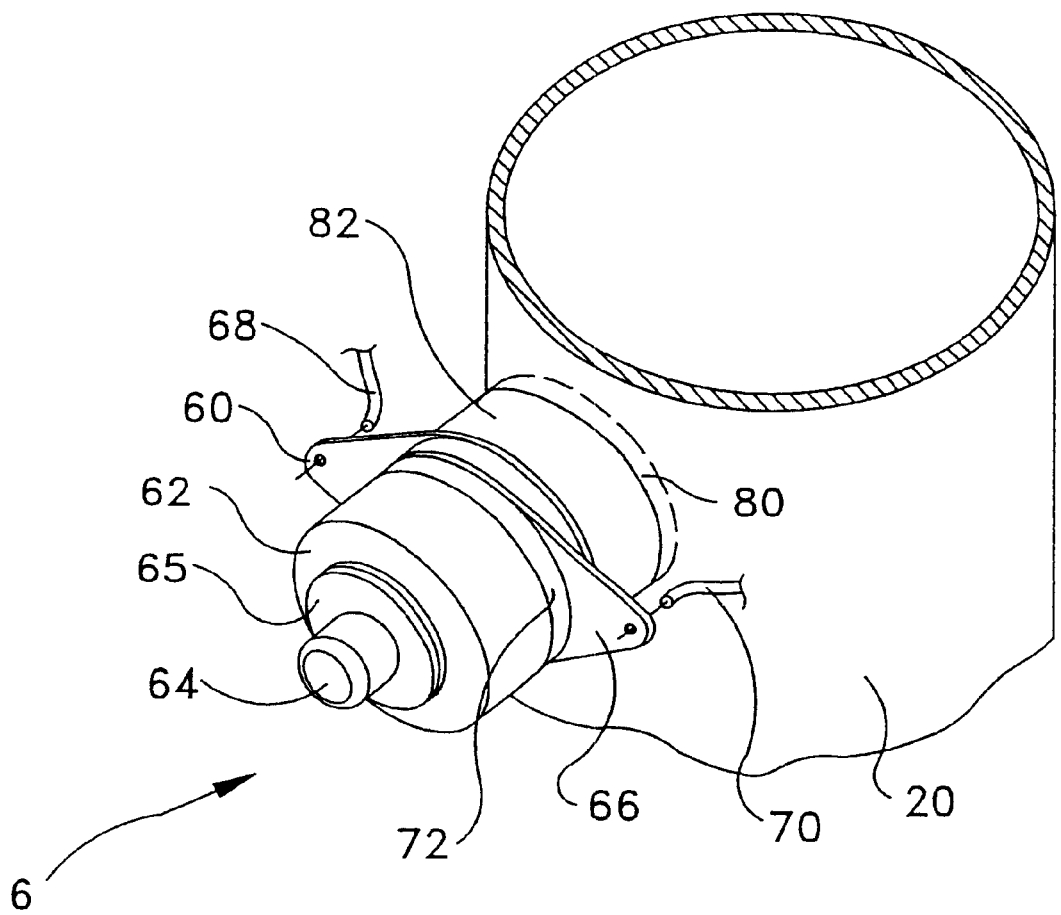
FIG. 4 is an enlarged pictorial view of a fragment of the FIG. 1 filter housing mounting an ultrasonic transducer.

FIGS. 4 and 5 detail a preferred transducer 36, as follows.

More particularly, the transducer 36 includes a screw 64 which threads into a central tapped hole in the outboard surface 82 of a surface mounting block 80 and a head that presses a axial stack of annular elements 60, 74, 66, 72, 62 and 65 against the block 80, as follows. Conductively abutting the block surface 82 is an annular conductive terminal plate 60 electrically connected to the ground side of the output of ultrasonic power supply UPS (FIG. 1) through a conductor 68 (FIG. 5). Abutting the plate 60 is an annular piezoelectric disk 74. Abutting the piezoelectric disk 74 is a second annular conductive terminal plate 66 electrically connected to the other side of the output of the ultrasonic power supply UPS (FIG. 1) through a conductor 70 (FIG. 5). Conductors 68 and 70 are insulated from each other and together define the conductor pair schematically shown by dotted line in FIG. 1 at 56. Center holes 75 and 67 in the piezoelectric disk 74 and outboard terminal plate 66 are larger in diameter than the screw 64 to prevent electrical contact of the screw 64 with the piezoelectric disk 74 and terminal plate 66. Abutting the terminal plate 66 is an annular ceramic insulator 72. Abutting the insulator 72 is a massive annular back slug 62 backed by washers 65, and in turn backed by the head of the screw 64. The screw 64 is tightened to press the washers 62, back slug 62, ceramic insulator 72, plate 66, piezoelectric disk 74 and plate 66 firmly against the surface mounting block 80 so as to form the rigid assembly that defines the transducer 36.

The mounting block 80 (FIG. 5) is fixed on the filter housing 20. In the FIG. 4 embodiment, the mounting block 80 is of circular cross section and fits snugly in a hole in the peripheral wall of the filter housing 20. The outer peripheral surface 83 of the mounting block 80 is sealingly fixed to the filter housing 20, preferably by welding. To this end, the block 80 is preferably of the same material as the filter housing 20, e.g. of stainless steel.

Other arrangements for a mounting the transducer 36 with respect to the filter housing 40 are contemplated, though less preferred. Two, for example, are disclosed in FIGS. 4 and 6, respectively, in the above mentioned pending application assigned to the Assignee of the present invention (Attorney's Ref: R-P Case 27), now U.S. Pat. No. 6,251,294.

The process liquid user PLU (FIG. 1) may be any of a variety of devices and/or industrial processes of a type including, for example, paint spraying systems such as vehicle manufacturer paint spray booths, petroleum drilling systems and refineries, paper making and coating facilities, etc., which require input and use of any one of a variety of composite liquids of the kind having (1) a carrier liquid and (2) coalescing solids particles. In the process liquid user PLU, the composite liquid is typically contaminated with larger impurity elements which then need to be filtered out, so that the filtered composite liquid can be returned to the process liquid user PLU for reuse therein. Examples of such composite liquids are discussed above in respect to Petter, et al. U.S. Pat. No. 3,161,159, which discussion need not be repeated here.

Certain composite liquids of the type above mentioned may be termed dilatant. Dilatant materials thicken when subjected to shear forces. Dilatant materials include composite liquids in which coalescing solids particles in the carrier liquid tend to stick together when the material is subjected to a sufficient shear force. Such particles may be caused to stick together by a variety of different bonds (e.g. mechanical interlocking, adhesive surfaces, electrostatic attraction, magnetic attraction, etc.). The degree to which the material is dilatant varies with the composition and the particle bonding effects that are present.

One dilatant material, for example, is a calcined clay slurry which comprises a carrier liquid (water) and coalescing solids particles (clay particles surfaced with protrusions which tend to interfinger with, and mechanically lock to, corresponding protrusions of adjacent particles, when the slurry experiences sufficient shear forces). Such slurry is subject to shear forces as it approaches and passes through a filter element gap. Such shear forces increase with increases in flow rate of the slurry through the filter element gap. Above a given flow rate, the clay particles stick together in a shear zone at the entry to the filter element gap and substantially instantly bridge the gap with a growing cake of clay particles which blind the gap to further clay particle flow. However, the carrier liquid (water) may continue to flow for a time through a bridging particle cake, and so deposit more particles on, and so thicken the bridging cake. This strips clay particles from liquid leaving the filter element. This destroys the slurry for its intended use in the process liquid user PLU, which needs a slurry of a given clay particle concentration, and cannot operate with a watered down version of the slurry or with water alone.

Figure 10:
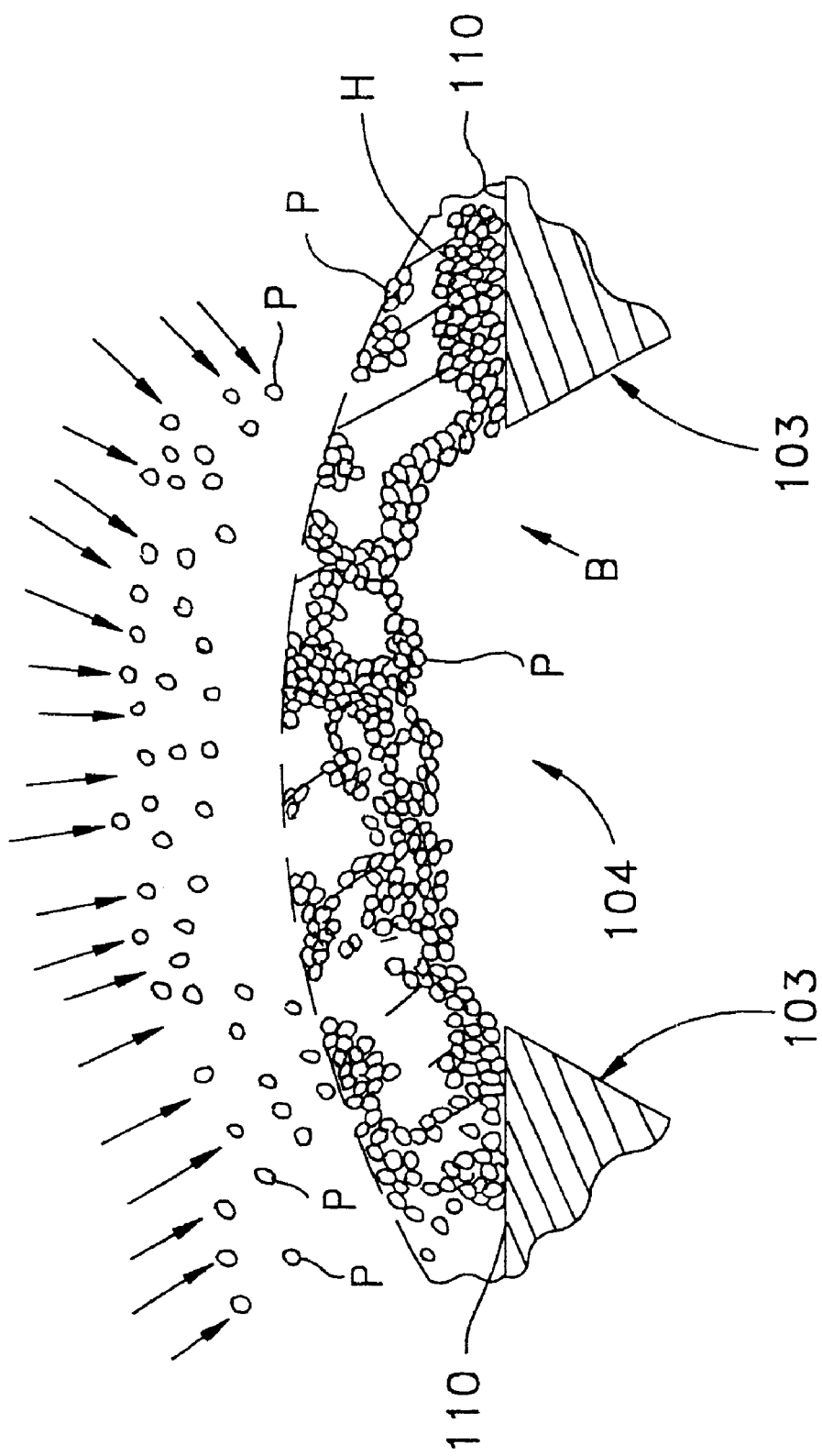
FIG. 10 is a view similar to FIG. 8 but schematically showing liquid-to-be-filtered applied to the inlet side of the filter element at a relatively fast rate, wherein coalescing particles have coagulated at a filter element gap and have bridged and blinded the gap.

While it is difficult to realistically represent the above described effects in a 2-dimensional drawing, FIGS. 8 and 10 attempt to do so. FIGS. 8 and 10 each schematically represent the number of coalescing solids particles P which in a short but discrete period of time occupy a zone leading into the filter element gap 104.

FIG. 8 shows relatively few particles P and so schematically represents a low carrier liquid flow rate through the filter unit.

FIG. 10 on the other hand, shows many more particles P and so schematically represents an attempt at a much higher carrier liquid flow rate through of the filter unit. FIG. 10 also shows, by reason of the higher flow rate, the thus increased shear forces on the composite liquid, the increased tendency of the coalescing solids particles to stick together in the zone of maximum shear at the gap 104 entrance, and the increased thickening of the portion of the composite liquid adjacent the gap 104 entrance, that there is formed a bridge B that blinds the gap 104 to further particle flow therethrough. In FIG. 10, the bridge B will be understood to include the area bounded by the dotted lines and including the hatch lines H.

Thus, a difficult problem in filtering composite liquids of this general type has been that even if proper filtering, as above described with respect to FIG. 8, can be accomplished, the flow rate through the filter unit may be very much below (e.g. an order of magnitude or more below) a commercially acceptable flow rate.

The ability of such a composite liquid to filter properly at a low flow rate but blind the filter element gaps at a higher attempted flow rate, may be roughly analogized to the difference between patrons slowly but successfully exiting through the doorway of a movie theater at the end of a movie, versus jamming of the doorway by patrons rushing to exit when panicked by a threat of fire. To extend the analogy, given an air pressure drop from inside the theater to the outside, air flow would continue through the doorway, whether patrons slowly and freely flow through, or jam, the exit doorway.

Applicant has found, in such bridging of the filter element gaps 104 by such a composite liquid, that the percentage of solids particles in the carrier liquid tends to be much less an issue than the bonding aggressiveness of the coalescing solids particles and the attempted rate of flow through the filter unit 20.

FIG. 9 schematically shows, in normal filtering like in FIG. 8, an impurities element E being rejected at the filter element gap 104, while coalescing solids particles P, with their carrier liquid, pass through the filter element gap 104. Thus FIG. 9 illustrates the desired filtering of the liquid-to-be-filtered.

Despite the above discussed sequence of development, by the Assignee of the present application, of methods and apparatus to aid filtering at commercial rates of these difficult composite liquids, advancing from air powered vibrator agitation of the liquid, to the described sequence of air powered vibrators fixed to the filter element, and finally to the present commercial wiper/scraper cleaning member which moves slowly but continuously along the inlet surface of the filter element, Applicant finds, even with this latest advance, that the more aggressive of these difficult composite liquids may immediately blind the filter element and start destroying the composite liquid before flow rate can be increased to anything close to a commercially acceptable rate (in some instances even up to an order of magnitude below a commercially acceptable rate). Surprisingly, Applicant has found that even with very difficult to filter composite liquids, such as these, flow rate can be not only maintained, but increased, in some instances by an order of magnitude or more, by the method and apparatus of the present invention.

With the inventive apparatus assembled and connected to the process liquid user PLU, as shown in FIG. 1, the ultrasonic power supply UPS is actuated, whereafter the inlet and outlet valves IV and OV are opened to begin the flow of liquid-to-be-filtered under pressure from the process liquid user PLU into the filter unit 20. Filtered composite liquid passes out of the filter unit outlet port 44, for reuse in the process liquid user PLU.

Figure 11:
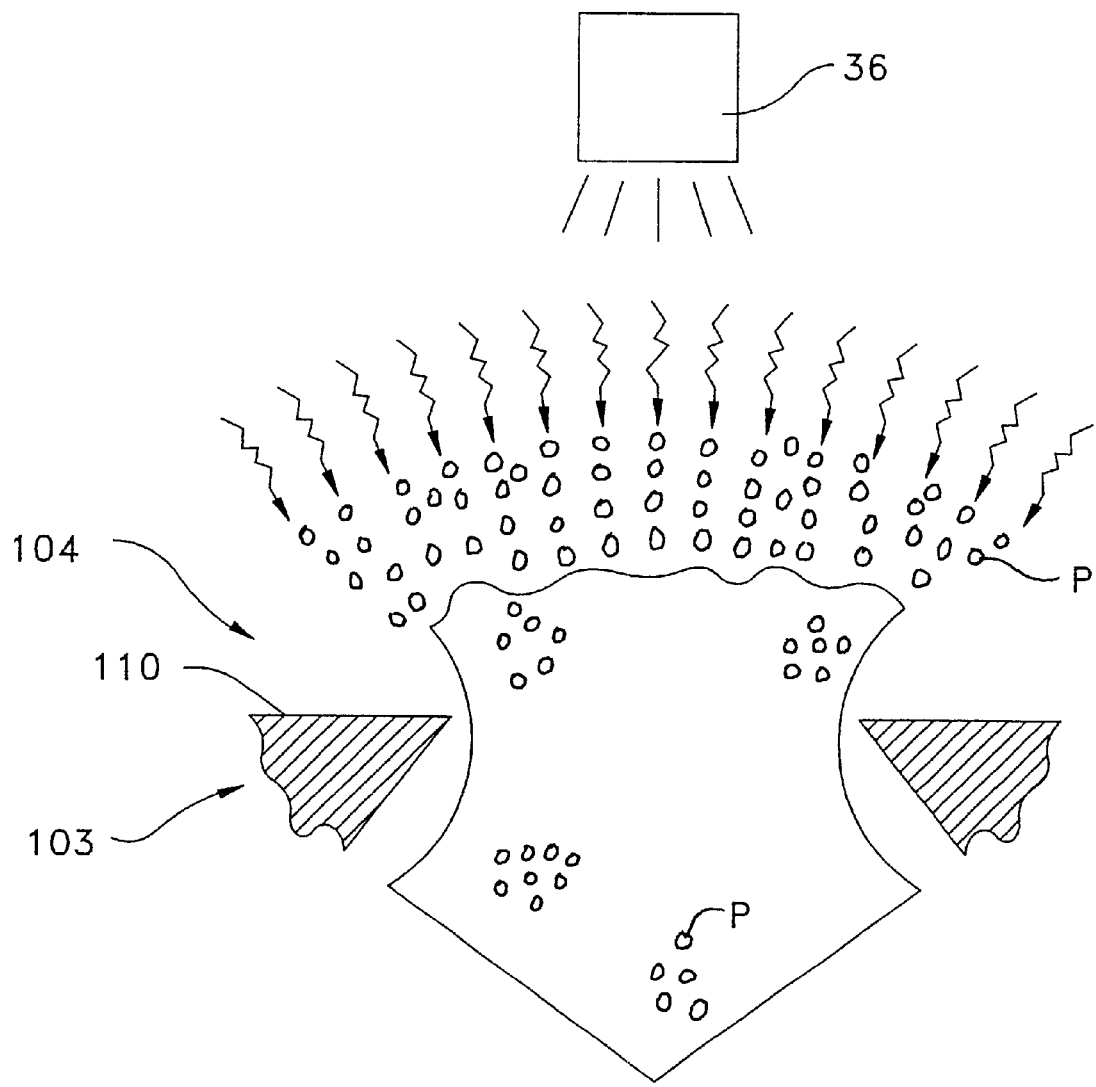
FIG. 11 is a view similar to FIG. 10 but wherein ultrasonic energy, applied to the liquid-to-be-filtered on the inlet side of the filter, allows flow of carrier liquid and coalescing particles through the filter element gap at such relatively fast rate without bridging or blinding of the gap.
Figure 12A:
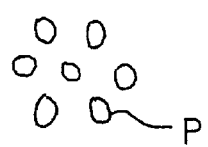
FIGS. 12A and 12B schematically show a small group of adjacent coalescing solids particles in carrier liquid (1) at rest, and (2).following formation of and beginning of implosion of, an ultrasonically formed cavitation vapor bubble in the carrier liquid, in the middle of the group of, so as to accelerate such particles.
Figure 12B:
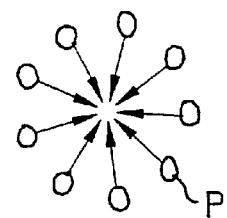
Figure 13A:
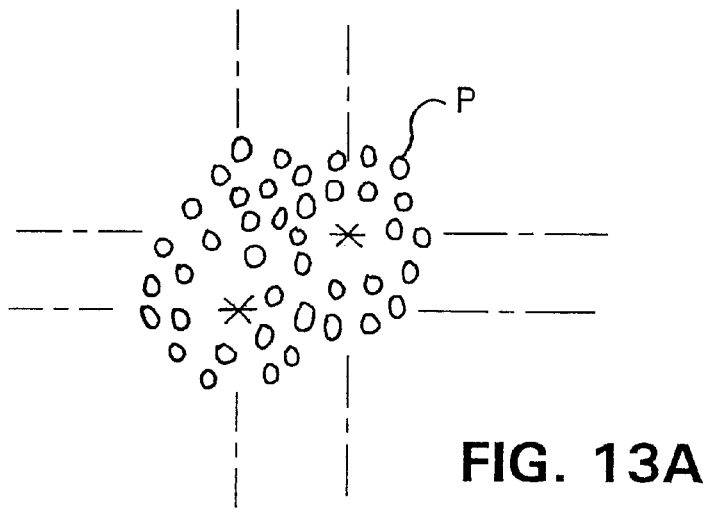
FIGS. 13A and 13B schematically show cavitation vapor bubble implosions occurring at successive instants in time in a larger group of coalescing solids particles in the carrier liquid.
Figure 13B:
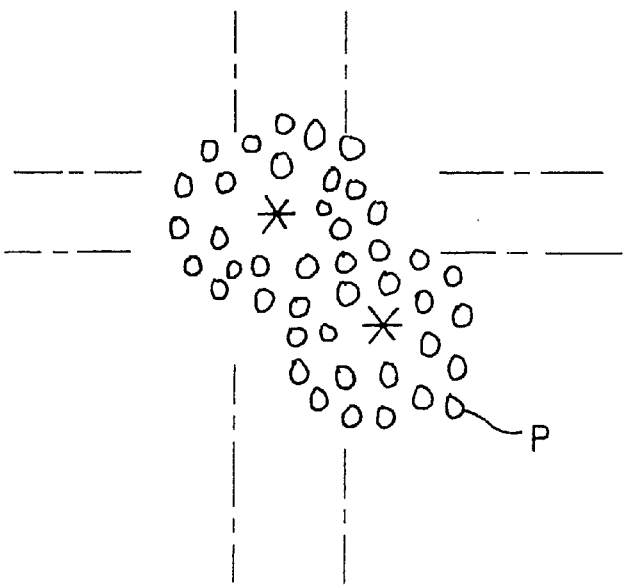

The ultrasonic transducers 36 are energized by the supply UPS at a relatively high power level sufficient to cause cavitation (vapor bubble formation and implosion) as schematically indicated in FIGS. 12A and 12B. The implosions, indicated by the * symbols in FIGS. 13A and 13B, are shown to occur randomly in a given micro-space in the liquid adjacent the filter element. These implosions release substantial kinetic energy which aggressively agitates the surrounding particles P, adjacent the filter element 40, to interfere with bridging of the gaps 164 by the particles P, as schematically indicated in FIG. 11.

To shut down the filtration process, the inlet and outlet valves IV and OV are closed, whereupon the ultrasonic power supply UPS is deenergized. Such a shutdown may be desired, for example, to rid the filter housing 20 of a collection 28 of impurities element E by opening the valve PV to the solids removal devise SR.

Modification

Figure 14:
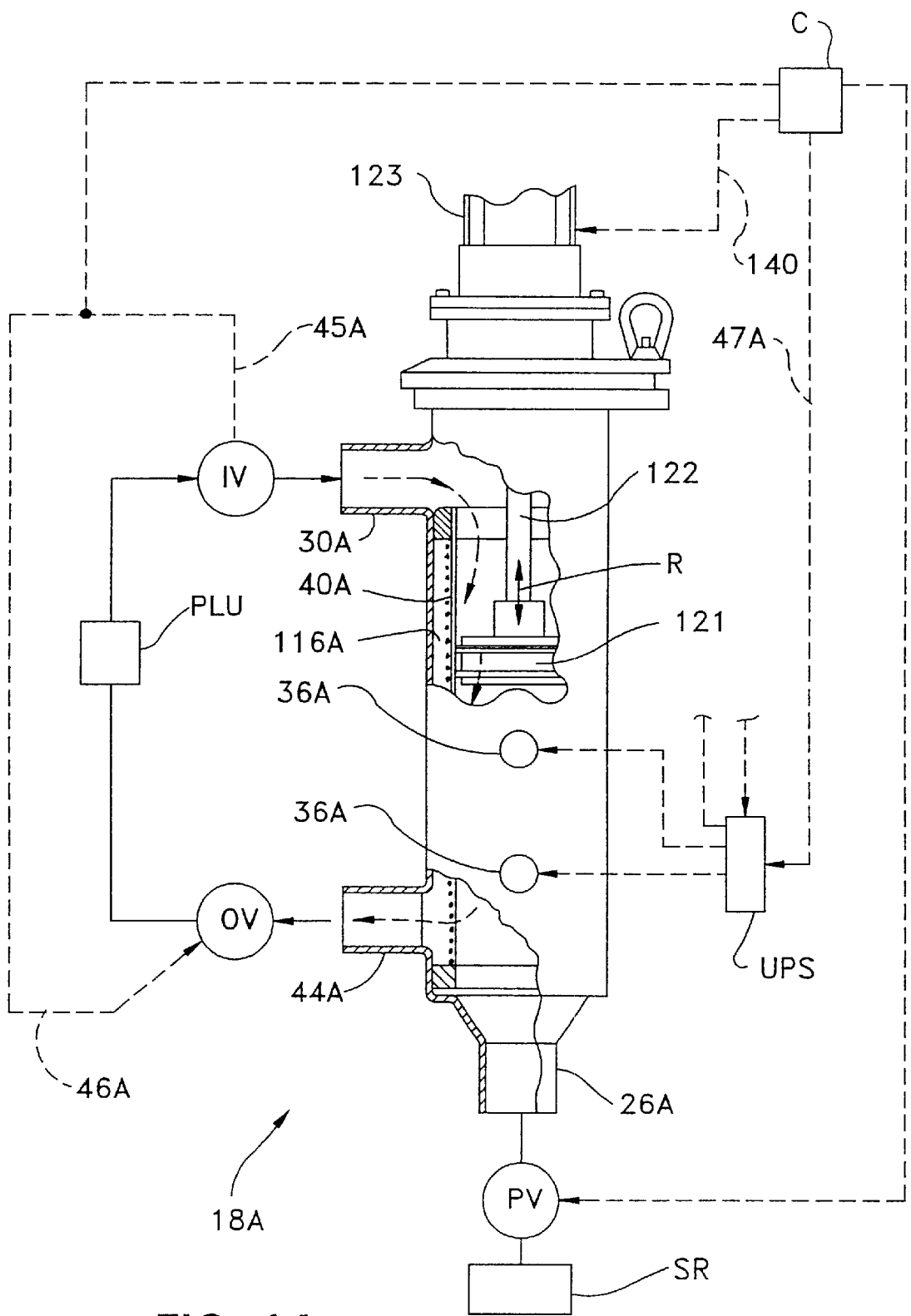
FIG. 14 is a fragment of FIG. 1 modified to substitute a schematically shown filter unit, having a wiper/scraper cleaning member of a pressure fluid actuated type shown in above referenced Davis, et al. U.S. Pat. No. 5,527,462, and embodying the present invention.

FIG. 14 is similar to FIG. 1, but substitutes a mechanical wiper/scraper cleaned filter unit 18A (FIG. 14) of the pressure fluid actuated type shown in above referenced Davis et al. U.S. Pat. No. 5,527,462, assigned to the Assignee of the present invention. Briefly, the filter unit 18A includes a housing 20A having an inlet port 30A and an outlet port 44A connected as in FIG. 1, namely through respective normally open valves IV and OV to the process liquid user PLU. A purge port 26A at the bottom of the filter housing 20A is normally closed by a purge valve PV as in FIG. 1. The filter housing 20A contains a coaxial, tubular filter element 40A, open at its top to the inlet port 30A and its bottom to the purge port 26A. The filter element 40A is surrounded by an annular filtered liquid zone 116A open to the outlet port 44A. The interior of the filter element 40A defines a liquid-to-be-filtered zone. A generally hockey puck-shaped, scraper/wiper cleaning member 121 snugly but slidably engages the interior surface of the filter element 40A and is reciprocatingly driven coaxially within the filter element 40A, in the direction of the arrow R, by any convenient means such as a piston rod 122 of a pressure fluid cylinder 123 fixed atop the filter housing 20A, such that the scraper/wiper cleaning member 121 repetitively moves up and down the length of the filter element 40A for the purpose of scraping and/or wiping filtered out material from the interior, inlet face of the filter element 40A. The member 121 has axial through passages (not shown) which allow free passage of liquid-to-be-filtered axially therethrough.

As schematically indicated in FIG. 14, ultrasonic transducers 36A are added to the housing 20A and connected to an ultrasonic power supply UPS substantially in the manner above disclosed with respect to FIGS. 1–13.

In FIG. 14, the control C is also connected, as indicated schematically by the broken line 140, to control the pressure fluid cylinder 123 so as to simultaneously (1) reciprocate the cleaning member 121, (2) energize the ultrasonic power supply UPS, and (3) hold open the inlet and outlet valves IV and OV and (4) maintaining the purge valve PV closed, during filtration.

EXAMPLE

In the present example, a liquid-to-be-filtered in the form of a calcined clay slurry having (1) a carrier liquid (water), (2) coalescing solids particles (calcined clay particles of the type above discussed) and smaller than the filter element gaps, and (3) impurities elements larger than the filter element gaps, was applied under pressure from the source UPS to the inlet port 30A of a filter unit 18A of the kind shown in FIG. 14, with the ultrasonic transducers 36A not energized, but with the wiping/scraping cleaning member in normal operation, moving back and forth along the inlet side of the filter element. The flow rate of liquid-to-be-filtered was started substantially at zero and then was gradually increased. When the flow rate reached about 2 gallons per minute, the output flow of composite liquid (the calcined clay slurry) stopped. In other words, the useable output of the filter unit stopped. This indicated blinding of the filter element gaps due to bridging by the coalescing solids particles (calcined clay particles). Thereafter, any further flow from the output port 44A was merely carrier liquid (water) largely stripped of its coalescing solids particles (calcined clay particles) and resulted from destruction, within the filter unit, of the process liquid (the composite liquid, or calcined clay slurry).

While complete termination of flow from the filter unit output port 44A may immediately, or soon, shut down the process liquid user PLU, a filter unit output of something other than the required process liquid (e.g. water rather than the required slurry), unless quickly detected, could injure the process in, or product of, the process liquid user PLU.

The above discussed DCF line of filter units marketed by the Assignee of the present invention (exemplified schematically in FIG. 14) has been successful in continuously filtering many composite liquids, (i.e. carrier liquid and coalescing solids particles of various kinds). However, in this example, the calcined clay slurry to be filtered was one of a member of particularly difficult composite liquids to filter.

Thereafter, with the filter unit 18A filled with liquid-to-be-filtered inside the filter element 40A and the inside wall of the filter element blinded by bridging coalescing solids particles, and the filter housing outside the filter element filled with stripped or partially stripped carrier liquid (primarily water), the ultrasonic power source UPS was actuated and in turn energized the ultrasound transducers 36A. A few minutes thereafter, bridge formation at the filter element gaps ceased, and continued axial travel of the wiper/scraper cleaning member 121 removed remaining bridges. Normal output of filtered composite liquid (calcined clay slurry) then resumed.

Thereafter, with the ultrasonic transducers 36A continuously energized, the flow rate through the filter unit was increased gradually but substantially, indeed by an order of magnitude or more, to reach sustainable flow rates in the range of 20–30 gallons per minute, without damage to the composite liquid (the calcined clay slurry) flowing from output port 44A.

In the present example, the transducers 36A were energized at a single frequency of about 40 KHz. Subsequently, other trials used other single frequency values, including 70 KHz with success. Applicant found no significant difference between single frequency actuation at 40 KHz and 70 KHz. It is contemplated that frequencies in the range of 30 to 150 KHz although it is contemplated that frequency may vary depending on the viscosity of the liquid-to-be-filtered.

In the present example, the ultrasonic frequency was maintained at a single, stable frequency level. However, it is contemplated that it may be useful to continuously vary the frequency (warble) or to switch back and forth between preselected frequencies (for example a fundamental frequency and a subharmonic or harmonic thereof).

In the present example, the filter element effective area was about 264 square inches and filter housing volume was about 0.65 cubic feet.

In the present example, the ultrasonic power source was operated at a relatively high output power level, namely, about 500 watts per cubic foot of filter housing internal volume, to provide vigorous ultrasonic agitation of the liquid in the filter unit, in the region of the filter element gaps 104, to prevent, or if present destroy, bridging by the coalescing solids particles. However, power levels are contemplated at least in the 500 to 1000 watts per cubic foot range. Such high power levels appear to cause no damage to the relatively durable metal filter element 40B.

Air bubbles or volatiles or coalescent solids particles or impurity elements of a soft/spongy character in the liquid-to-be-filtered may tend to absorb some of the applied ultrasonic energy needed for cavitation (vapor bubble formation and implosion) and resultant coalescent solids particle agitation. Conventional ultrasonic cleaning vats contain a fixed quantity of liquid from which ultrasonic energy in time can eliminate air bubbles or volatiles before receiving a workpiece to be cleaned, whereas in pressure liquid filtration the liquid-to-be-filtered flows continuously so there is little or no time for applied ultrasound energy to eliminate air bubbles or volatiles before liquid-to-be-filtered approaches the filter element. Applicant has found that application of very high ultrasonic power (e.g. 500–1000 watts per cubic foot of filter housing volume) to the liquid in the filter housing can overpower any such energy absorbing characteristics of a given liquid so as to provide sufficient cavitation, and hence vapor bubble formation and implosion, and hence particle agitation, so as to avoid coalescing solids particle bridging of filter element gaps and so continue proper filtration of difficult liquids-to-be-filtered of the kind discussed herein.

To maximize efficiency of electrical energy conversion to ultrasonic agitation of the liquid-to-be-filtered adjacent the filter element, it is desirable to match the output frequency of the ultrasonic power supply with the fundamental resonant frequency of the transducer 36A. Ultrasonic power supplies having different selectable frequencies are available. It is convenient to change the resonant frequency of the transducer 36 (FIG. 5) by changing the weight of the massive annular backing slug 96, wherein increased slug weight reduces resonant frequency and vice versa.

In the present example, the filter element gap width was about 30 microns, the particle size about 1 micron and the size of impurity elements exceeded the gap width. However, Applicant contemplates use of the inventive method and apparatus with rigid filter elements of gap ranging upward from about 15 microns (wedge wire and screen filter elements) or 5 microns (mesh filter elements), with gap width larger than coalescing solids particle width and less than the impurity elements to be filtered out The solids content of composite liquids filtered under the present invention may range above or below the 70% solids content mentioned in an above discussed prior patents. However, Applicant finds it is not a percentage of solids, but rather the character of the particles that determines the bridging tendency. The composite liquid must, however, be pumpable, or flowable.

The ultrasonic method and apparatus herein described for filtering of the described difficult liquids-to-be-filtered (e.g. dilatant or viscous or thixotropic liquids) provides substantial and surprising advantages over the air powered vibrators of the above discussed prior Petter, Reece, DeVisser, Rishel and Davis '176 patents.

For example, such an air powered vibrator can apply only a relatively low energy input to the filter unit, due for example to limitations in the air pressure and flow available to move the ball in its race, limitation to relatively low audio frequency vibration (e.g. 500 Hz vibration, namely about 2 orders of magnitude less than the frequency of vibration under the present invention), and limitation to relatively low amplitude of movement (for example in view of space limitations in the filter housing, as in Petter above discussed, or/and necessary rigidity of the filter element or its mounting in the filter housing, as in Reece, DeVisser, Rishel and Davis '176 above discussed).

Further, the air powered vibrator energy input to the filter unit tends to be localized and thus difficult to apply evenly to liquid over the entire filter element area, due to the bulkiness of such an air powered vibrator, which has left room for only one in a given filter unit.

Further, such an air powered vibrator is subject to mechanical wear due to friction between the orbiting ball and its race, compounded by contaminants in the air flow powering it, which limits vibrator life and may require its eventual replacement.

Further, mechanical wear in such an air powered vibrator tends to degrade its energy output over time, e.g. by gradual reduction in vibration frequency and/or amplitude, which degradation is not reliably predictable and thereby not reliably compensatable.

Further, particularly as compared to electric power, air power is very expensive per unit of power, due to the multiple steps required to translate electrical power through motor rotation, compressor air output, air transfer hoses output, and ball motion in the vibrator casing, to agitation of the filter element and/or liquid in the filter unit, and the resultant extra cost of equipment and energy loss per step.

In contrast, under the present invention, power input can be much higher (as mentioned, for example, 500 to 1000 watts per cubic foot of filter housing volume, frequency is approximately two orders of magnitude higher, less. or no room is required inside the filter housing for the ultrasonic transducers 36, many more vibration sources (transducers) can be used per filter unit, the number and spacing (circumferentially and axially) of ultrasound transducers 36 can be relatively easily varied, distribution of energy over the entire filtering zone is relatively very even, vibrating source mechanical wear or life limitations can be substantially eliminated, vibration source performance is substantially constant over long periods of time, and cost per unit of power applied to the liquid in the filter housing is relatively low.

Figure 2:
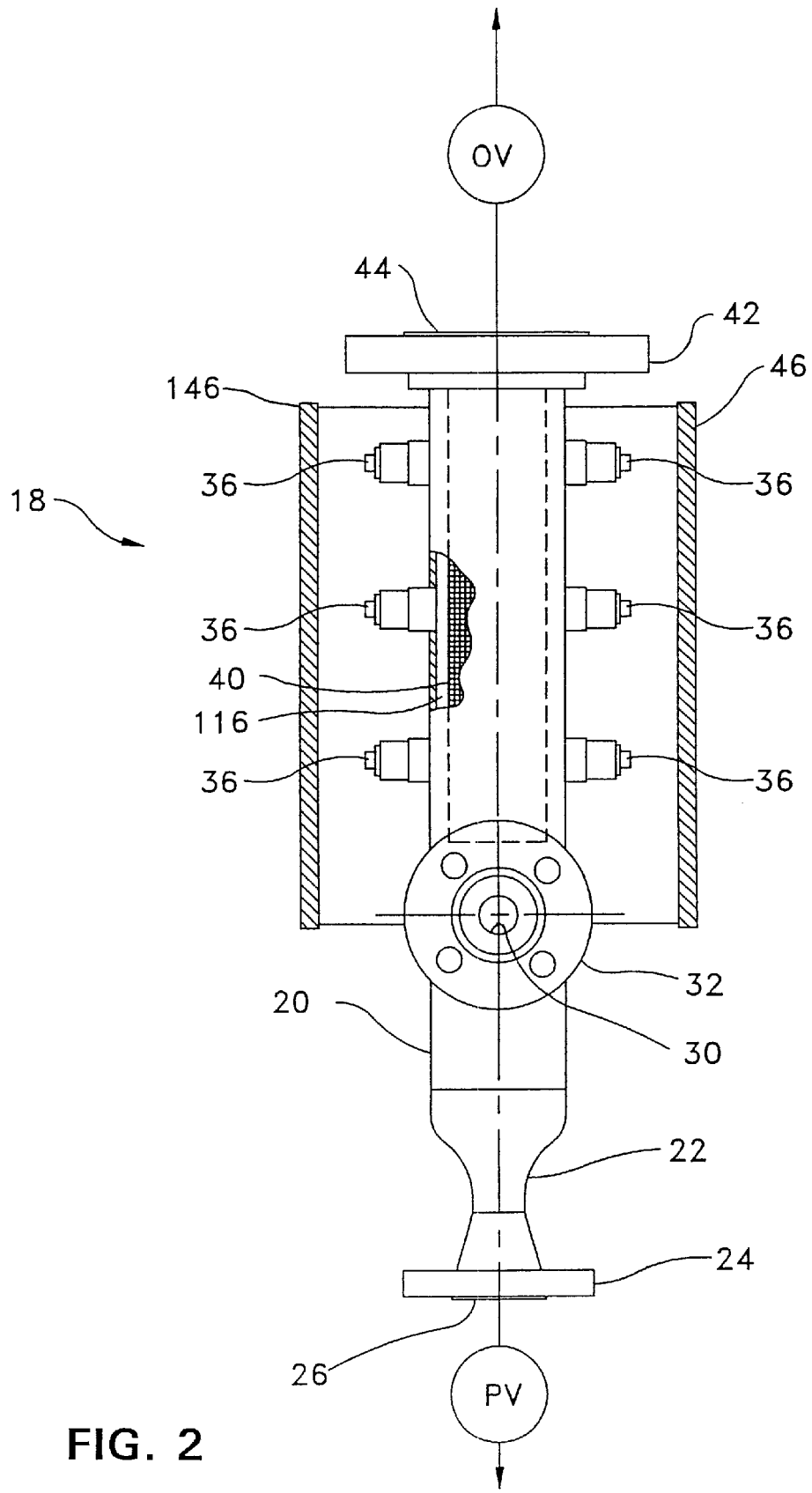
FIG. 2 is a partially broken side view of the FIG. 1 filter unit, with the transducer casing broken away in central cross-section to show the transducers.

Whereas the above discussed example applied the invention to an inside-to-outside filtration flow and mechanically cleaned filter unit in FIG. 14, the invention is applicable to outside-to-inside flow and/or nonmechanically cleaned filter units, for example as FIGS. 1 and 2.

Further variations are contemplated.

For example, the conventional single filter element in FIGS. 1 and 2 can be replaced by a group of filter elements, for example of the type shown in the above discussed DeVisser and Davis '176 patents.

Figure 15:
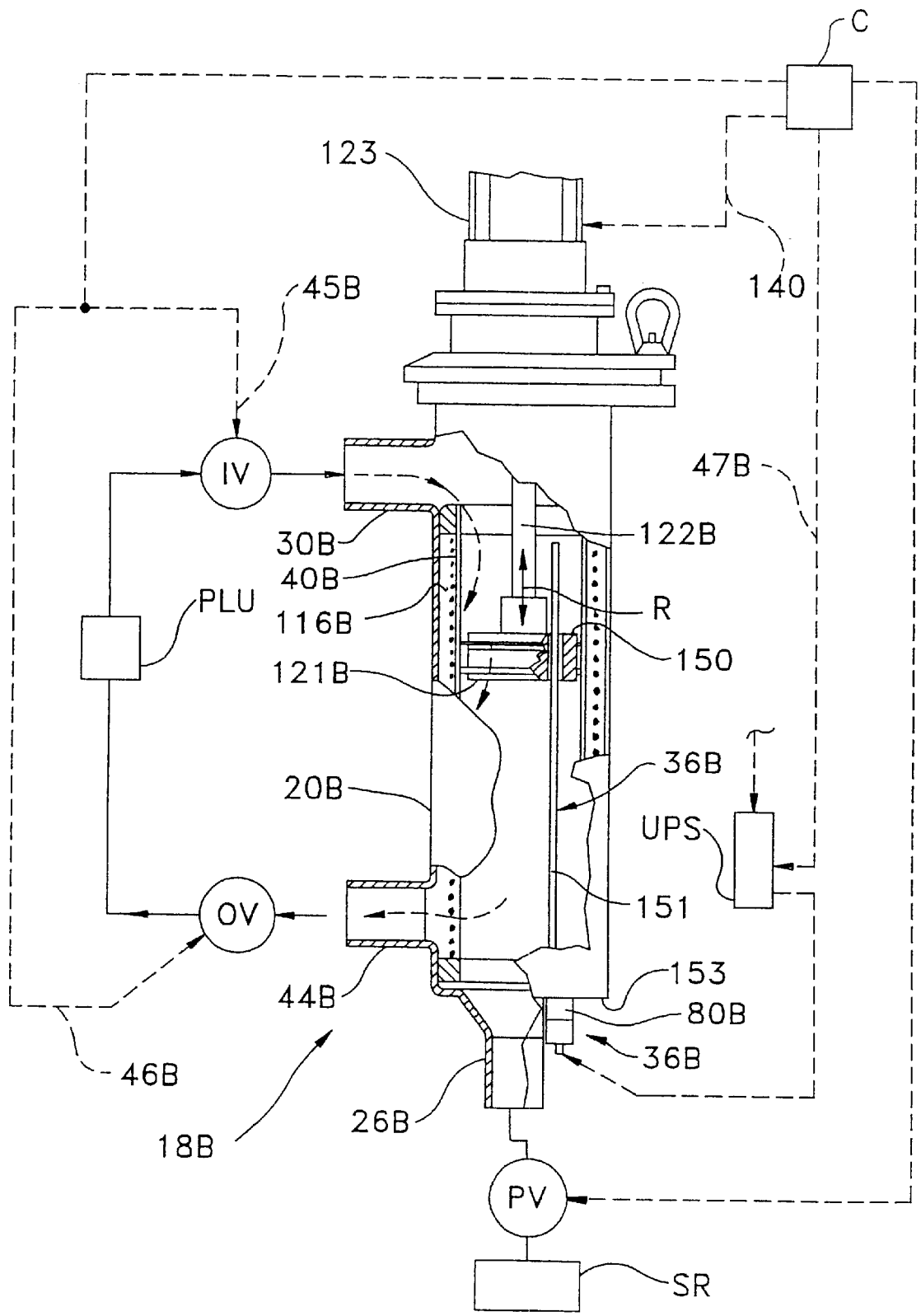
FIG. 15 is a view similar to FIG. 14 but modified by substitution of a different ultrasound transducer, which extends into the filter element.

Further, it is contemplated that at least one ultrasonic transducer may be provided with an inboard portion which extends into the filter housing and substantially along the length of the filter element. Thus, for example, FIG. 15 shows a modification, of the FIG. 14 apparatus and wherein at least one ultrasonic transducer 36B is fixed sealingly on the housing 20B. The transducer 36B has an elongate active portion 151 which extends into the housing 20B and loosely into the adjacent end of the filter element 40B.

The transducer portion 151 extends loosely within the filter element 40B, substantially parallel to the length axis of the filter element 40B and the path of travel of the cleaning member 121B. The cleaning member 121B has an axial throughhole 150 located eccentrically and inboard of the periphery thereof, and of sufficient diameter to loosely surround the elongate transducer portion 151. Thus, the cleaning member 121B is free to reciprocate within the filter 40B and along the transducer portion 151, without contact with or interference by the transducer portion 151.

The transducer portion 151 is an elongate extension of the transducer mounting block 80B which is here sealingly fixed, as by welding, in a corresponding hole (not shown) in the bottom 153 of the housing 20B. In the embodiment shown, the purge port 26B is modified in shape to make room for the portion of the transducer 36B which extends through and below the bottom 153 of the housing 20B.

If desired, other mountings may be provided at the bottom 153 of the housing 20B for fixing the transducer 36B to the bottom wall 153. For example, the bottom wall 153 may be provided with a depending boss (not shown) which is internally threaded to removably receive an externally threaded modification of the mounting block 80B.

Upon energization from the ultrasonic power source UPS, the transducer 36B, acting through its portion 151 within the filter element 40B, imparts ultrasonic vibration to the liquid within the filter element, namely the liquid-to-be-filtered, while allowing continuing cleaning reciprocation of the cleaning member 121B axially in the filter element 40B.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A method for increasing flow rate, through a liquid pressure filter unit, of liquid-to-be-filtered having (1) a carrier liquid, (2) coalescing solids particles which tend to stick together to bridge and thus blind a filter element gap sized substantially larger than the size of an average said coalescing solids particle, and (3) larger, impurity elements to be filtered out of said liquid-to-be-filtered and sized larger than such filter element gaps, comprising the steps:

providing a liquid pressure filter unit having a housing including an inlet and an outlet and a filter element having gaps substantially larger than said particles but smaller than said larger impurity elements, said filter element having a relatively low through flow rate in which said carrier liquid and coalescing solids particles pass reliably through said gap, said filter element having a relatively higher through flow rate at which said coalescing solids particles rapidly coalesce and bridge and blind said gaps and thus substantially immediately render said filter unit substantially inoperative;

fixing at least one ultrasonic transducer on said housing for contact with liquid-to-be-filtered in said housing;

admitting liquid-to-be-filtered under pressure through said filter unit inlet and into contact with said filter element while energizing said ultrasonic transducer;

transmitting said ultrasonic vibrations through said liquid-to-be-filtered and thereby agitating, at an ultrasonic frequency, coalescing solids particles adjacent said gaps, thereby facilitating passage of said carrier liquid and coalescing solids particles through said gaps and preventing said coalescing solids particles from coalescing and thus bridging and blinding said gaps while continuing said through flow at said relatively higher through flow rate.

2. The method of claim 1 wherein the ratio of gap to particle size is in the approximate ratio of 30:1.

3. The method of claim 1 wherein said coalescing particle width is in the range of 1 to 50 microns.

4. The method of claim 3 wherein a typical coalescing particle width is about one micron.

5. The method of claim 1 wherein said gap size is in the range of 15 to 100 microns.

6. The method of claim 5 wherein said gap size is about 30 microns.

7. The method of claim 6 wherein typical particle size is about one micron.

8. The method of claim 1 wherein said liquid-to-be-filtered is of a kind including colloidal gels, lime slurries, clay slurries, mineral slurries, starch solutions, and clay coatings.

9. The method of claim 1 wherein said process liquid system is of a kind including petroleum drilling systems, petroleum refineries, paint spraying systems, paper making machines, and paper coating apparatus.

10. The method of claim 1 in which said filter element has face wires on its input side and supported by support wires on its output side, said face wires are generally of isosceles triangular shape having a base facing toward and in contact with incoming liquid-to-be-filtered, adjacent face wires being spaced by a substantially trapezoidal cross section gap such that said gap widens along the normal path of flow through said filter element wall.

11. The method of claim 10 in which the closest spaced portion of the respective cross sections of adjacent face wires defines the gap.

12. The method of claim 1 in which said impurity elements have a minimum width of about 15 microns.

13. The method of claim 1 in which said ultrasonic frequency is about 40 kilohertz.

14. The method of claim 1 in which said ultrasonic frequency is in the range of about 30 to 150 KHz.

15. The method of claim 1 in which electrical power applied to said ultrasonic transducers is at least about 500 watts per cubic foot of housing volume.

16. The method of claim 1 in which the electric power applied to said ultrasonic transducers has at least about 1000 watts per cubic foot of filter housing volume.

17. The method of claim 1 in which said gap size exceeds about 5 microns.

18. The method of claim 1 in which said liquid-to-be-filtered is selected from the group consisting of dilatant liquids, viscous liquids and thixotropic liquids.

19. Method of preventing bridging, and thereby stopping of filter flow, through a liquid pressure filter unit, of liquid-to-be-filtered, of a kind having (1) a carrier liquid, (2) coalescing solids particles which tend to stick together to bridge and thus blind a filter element gap sized larger than the width of said particles, and (3) larger impurity elements to be filtered out of said liquid to be filtered and sized larger than such a filter element gap, comprising the steps of:

I. providing a liquid pressure filter unit comprising
      (A) a housing having a housing wall and an inlet and an outlet which open through said wall,
      (B) a filter element fixed in said housing and having an inlet side communicating with said inlet, and outlet side communicating with said outlet and a rigid, self-supporting filtering wall of the kind including
         (1) spaced, side-by-side face wires communicating with said inlet and defining said inlet side,
         (2) spaced, side-by-side support wires extending generally at right angles to said face wires, fixedly locating said face wires, and defining said outlet side, and
         (3) gaps, wherein a given said gap is bounded by an adjacent pair of said face wires and an adjacent pair of said support wires,
      (C) at least one ultrasonic transducer (1) located outside said housing, (2) fixed to said housing, (3) extending through said housing wall, and (4) having an active inner face in direct contact with liquid-to-be-filtered within said housing, without need to occupy space within said housing or interfere with flow in said housing;

II. continuously, and simultaneously ultrasonically enhancing, filtering by:
      (A) from a process liquid system, flowing liquid-to-be-filtered under pressure through said inlet to said inlet side of said filter element, said liquid to be filtered being of the kind including clay slurries and white mineral slurries and having (1) a carrier liquid, (2) coalescing solids particles which tend to stick together to bridge and thus blind a filter element gap sized larger than the width of said particles and (3) impurity elements to be filtered out of said liquid-to-be-filtered and sized larger than such a filter element gap and coalescing solids particles, (B) passing through said filter element wall gaps said carrier liquid and coalescing solids particles but blocking passage through said gaps of said larger impurity elements by means of said wires, said coalescing solids particles having a relatively slow flow rate at which they flow easily and in sequence through a said filter element wall gap and having a relatively faster rate at which they tend to stick together and to bridge and blind said filter element wall gap, (C) setting said flow at said relatively faster rate while continuously electrically energizing said ultrasonic transducer and therewith (1) continuously applying ultrasonic energy from said ultrasonic transducer directly to said liquid-to-be-filtered in contact with said inlet side of said filter element wall, continuously agitatingly moving said coalescing solids particles adjacent a said filter element wall gap at an ultrasonic frequency and therewith (1) interfering with coagulating of said coalescing solids particles at said gap, (2) preventing bridging and blinding of said gap by said coalescing solids particles, and (3) allowing said coalescing particles to pass through said gap at said relatively faster rate, (D) directing said carrier liquid and coalescing solids particles from said outlet side of said filter element through said outlet to a process liquid system;

whereby flow of said coalescing solids particles through said filter element wall gaps continues at said relatively faster rate without risk of bridging and blinding thereby of said filter element wall gaps.

20. The method of claim 19 in which said filter element is of a type including a screen of at least 5 micron gap size and welded wire or mesh of gap size exceeding 15 microns.

21. The method of claim 19 in which said ultrasonic frequency is in the range of about 40–70 KHz and said ultrasonic transducers have applied thereto electrical power in the range of about 500 to 1000 watts per cubic foot of filter housing volume.

22. The method of claim 19 wherein said liquid-to-be-filtered is of a kind including liquids of a viscous or thixotropic or dilatant nature, colloidal gels, lime slurries, clay slurries, mineral slurries, starch solutions, and clay coatings.

23. The method of claim 19 wherein said process liquid system is of a kind including petroleum drilling systems, petroleum refineries, paint spraying systems, paper making machines, and paper coating apparatus.

24. The method of claim 17 in which the coalescing solids particles content of the composite liquid exceeds 50%, a typical coalescing particle width is about 1 micron, the ratio of gap to particle size is about 30 to 1, said liquid-to-be-filtered is of a kind including liquids of a viscous or thixotropic or dilatant nature, colloidal gels, lime slurries, clay slurries, mineral slurries, starch solutions, and clay coatings, wherein said process liquid system is of a kind including petroleum drilling systems, petroleum refineries, paint spraying systems, paper making machines, and paper coating apparatus, wherein said face wires are generally of isosceles triangular shape having a base facing toward and in contact with incoming liquid-to-be-filtered, adjacent face wires being spaced by a substantially trapezoidal cross section gap such that said gap widens along the normal path of flow through said filter element wall, the closest spaced portion of the respective cross sections of adjacent face wires defining said gap, in which said ultrasonic frequency is a frequency selected from the range of about 40 to 70 KHz and the electric power applied to said ultrasonic transducers is selected from the range of 500 to 1000 watts per cubic foot of filter housing volume.

25. A method for increasing the continuous filtering flow rate through a pressure liquid filter unit of liquid-to-be-filtered having (1) a carrier liquid, (2) coalescing solids particles which tend to adhere and bridge filter element gaps sized substantially larger than said particles and (3) larger impurity elements to be filtered out of said liquid-to-be-filtered and sized larger than such filter element gaps, comprising:

providing a pressure liquid filter unit having a housing with an inlet and an outlet and containing a filter element having gaps, a given said gap being sized to reliably pass said carrier liquid and coalescing solids particles at a first relatively low liquid flow rate, but blocking coalescing solids particles passage therethrough due to bridging of said given gap by said coalescing solids particles at a relatively high liquid flow rate;

simultaneously flowing said liquid-to-be-filtered under pressure through said inlet into said housing at said relatively high flow rate and applying ultrasonic energy to said liquid-to-be-filtered in said housing;

at an ultrasonic frequency agitating said coalescing solids particles adjacent said given gap and thereby passing said carrier liquid and coalescing solids particles through said given gap at said relatively high flow rate without bridging and blinding of said given gap by said coalescing solids particles.

26. Apparatus for preventing bridging, and thereby stopping of filter flow, through a liquid pressure filter unit supplied with liquid-to-be-filtered of a kind having (1) carrier liquid, (2) coalescing solids particles which tend to stick together to bridge and thus blind a filter element gap sized larger than the width of the particles, and (3) larger impurity elements to be filtered out of the liquid-to-be-filtered and sized larger than such a filter element gap, the apparatus comprising:

a housing having a housing wall, and an inlet and an outlet which open through said wall;

at least one filter element fixed in said housing and having an inlet side communicating with said inlet, an outlet side communicating with said outlet, and a rigid self-supporting filtering wall of a kind including elements fixed together to bound filtering gaps;

at least one ultrasonic transducer (1) located outside said housing, (2) fixed to said housing, (3) extending through said housing wall, and (4) having an active inner portion in direct contact with liquid within said housing;

control means for continuously
 (A) holding open said inlet and outlet to flow through said filter element of liquid-to-be-filtered under pressure of a kind having (1) a carrier liquid, (2) coalescing solids particles which tend to stick together to bridge and thus blind a filter element gap sized larger than the width of said particles and (3) impurity elements to be filtered out of said liquid-to-be-filtered and sized larger than a filter element gap and coalescing solids particles, and
 (B) simultaneously applying ultrasonic energy from said transducer to at least said carrier liquid and coalescing solids particles and thus avoiding bridging and blinding of a filter element gap by such coalescing solids particles;

whereby flow of said coalescing solids particles through said filter element wall gap continues at the faster rate than in the absence of said ultrasonic transducer.

27. The apparatus of claim 26 including an ultrasonic power supply controlled by said control means and capable of electric power output in the range of 500 to 1000 watts per cubic foot of filter housing volume.

28. The apparatus of claim 27 in which said ultrasonic power supply has an output frequency in the range of about 40 KHz to 70 KHz.

29. The apparatus of claim 27 in which said ultrasonic power supply has an output frequency in the range of about 30 KHz to 150 KHz.

30. The apparatus of claim 27 including a mechanical cleaning device supported for cleaning engagement with a surface of the filter element and for movement over substantially the entire area of the filter element, and a power unit energizable for repetitively moving said mechanical cleaning device with respect to said filter element, said control means being operatively associated with said power unit for simultaneous (1) operation of said cleaning device, (2) energization of ultrasonic power supply and (3) maintaining open of said inlet and outlet.

31. The apparatus of claim 30 in which said ultrasonic transducer extends into said filter housing and into said filter element and extends at least a major length of said filter element.

32. The apparatus of claim 31 in which said filter element has an interior face engaging said liquid-to-be-filtered, said mechanical cleaning device having a path of movement substantially coaxial with said filter element, said mechanical cleaning device having an axial through opening, said ultrasonic transducer extending loosely through said through opening and being of sufficient length to occupy said through opening throughout the path of movement of said mechanical cleaning device.

* * * * *

UNITED STATES PATENT AND TRADEMARK OFFICE
CERTIFICATE OF CORRECTION

PATENT NO. : 6,395,186 B1
DATED : May 28, 2002
INVENTOR(S) : Allen De Kock et al.

It is certified that error appears in the above-identified patent and that said Letters Patent is hereby corrected as shown below:

Column 15,
Line 49, replace "17" with -- 19 --.

Signed and Sealed this

Fifteenth Day of October, 2002

*Attest:*

*Attesting Officer*

JAMES E. ROGAN
*Director of the United States Patent and Trademark Office*